US010791485B2

(12) United States Patent
Patil et al.

(10) Patent No.: US 10,791,485 B2
(45) Date of Patent: Sep. 29, 2020

(54) SYSTEMS AND METHODS FOR QUICK USER DATAGRAM PROTOCOL INTERNET CONNECTION (QUIC) WITH MULTIPATH

(71) Applicant: Cisco Technology, Inc., San Jose, CA (US)

(72) Inventors: Prashanth Patil, San Jose, CA (US); Ram Mohan Ravindranath, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 147 days.

(21) Appl. No.: 16/161,951

(22) Filed: Oct. 16, 2018

(65) Prior Publication Data

US 2020/0120555 A1 Apr. 16, 2020

(51) Int. Cl.
*H04W 36/00* (2009.01)
*H04L 29/06* (2006.01)
*H04W 12/08* (2009.01)
*H04W 12/06* (2009.01)
*H04W 76/22* (2018.01)
*H04W 76/11* (2018.01)
*H04L 12/707* (2013.01)

(52) U.S. Cl.
CPC ......... *H04W 36/0038* (2013.01); *H04L 45/24* (2013.01); *H04L 63/0428* (2013.01); *H04L 63/0807* (2013.01); *H04W 12/06* (2013.01); *H04W 12/08* (2013.01); *H04W 76/11* (2018.02); *H04W 76/22* (2018.02)

(58) Field of Classification Search
None
See application file for complete search history.

(56) References Cited

U.S. PATENT DOCUMENTS

| 7,688,820 | B2 | 3/2010 | Forte et al. |
| 9,628,443 | B2 | 4/2017 | Roskind et al. |
| 9,794,238 | B2 | 10/2017 | Wood et al. |
| 2016/0094539 | A1* | 3/2016 | Suresh ............... H04L 67/42 726/7 |

(Continued)

FOREIGN PATENT DOCUMENTS

WO 2017100640 A1 6/2017

OTHER PUBLICATIONS

Lychev et al., "How Secure and Quick is QUIC? Provable Security and Performance Analyses," 2015 IEEE Symposium on Security and Privacy, San Jose, CA, 2015, pp. 214-231, doi: 10.1109/SP.2015.21, (Year: 2015).*

(Continued)

*Primary Examiner* — Piotr Poltorak

(57) ABSTRACT

A disclosed method is performed at a server (e.g., a content delivery network (CDN) server). The server receives from a QUIC client a first token, where the first token includes a first connection identifier that identifies a first path connecting the QUIC client to the server. The server validates the first token, including validating path properties associated with the first path extracted from the first token. The server further generates a second token associated with a second connection identifier that identifies a second path connecting the QUIC client to the server in accordance with a successful validation of the first token. Additionally, the server transmits the second token to the QUIC client.

20 Claims, 9 Drawing Sheets

(56) References Cited

U.S. PATENT DOCUMENTS

| | | | | |
|---|---|---|---|---|
| 2017/0041836 | A1* | 2/2017 | Huang | H04W 36/08 |
| 2017/0126643 | A1* | 5/2017 | Wood | H04L 9/0861 |
| 2017/0289046 | A1* | 10/2017 | Faccin | H04L 47/2441 |
| 2019/0028440 | A1* | 1/2019 | Eriksson | H04L 63/0281 |
| 2019/0208554 | A1* | 7/2019 | Ruiz | H04W 80/06 |
| 2019/0229903 | A1* | 7/2019 | Balasubramanian | H04L 63/0485 |
| 2019/0319873 | A1* | 10/2019 | Shelar | H04L 67/28 |
| 2019/0320479 | A1* | 10/2019 | Choudhary | H04L 45/24 |
| 2020/0008120 | A1* | 1/2020 | Beck | H04W 36/0022 |
| 2020/0008248 | A1* | 1/2020 | Beck | H04W 48/20 |
| 2020/0120015 | A1* | 4/2020 | Boucadair | H04L 12/66 |
| 2020/0145324 | A1* | 5/2020 | Wei | H04L 69/16 |

OTHER PUBLICATIONS

Saverimoutou et al., "Which secure transport protocol for a reliable HTTP/2-based web service: TLS or QUIC?," 2017 IEEE Symposium on Computers and Communications (ISCC), Heraklion, 2017, pp. 879-884, doi: 10.1109/ISCC.2017.8024637, (Year: 2017).*

Nalawade et al., "Comparison of Present-day Transport Layer network Protocols and Google's QUIC," 2018 International Conference on Smart City and Emerging Technology (ICSCET), Mumbai, 2018, pp. 1-8, doi: 10.1109/ICSCET.2018.8537265, (Year: 2018).*

Coninck et al. "Multipath QUIC: Design and Evaluation", ACM ISBN 978-1-4503-5422-6/17/, Dec. 2017, (Year: 2017).*

Letamendia et al., "LTE Standards", ISBN: 9781848215887, Nov. 2014, (Year: 2014).*

Viernickel et al., "Multipath QUIC: A Deployable Multipath Transport Protocol", IEEE 978-1-5386-3180-5/18, 2018 (Year: 2018).*

Langley et al., "The QUIC Transport Protocol: Design and Internet-Scale Deployment", ACM ISBN 978-1-4503-4653-5/17/08, Aug. 2017 (Year: 2017).*

Iyengar et al, "QUIC: A UDP-Based Multiplexed and Secure Transport draft-ietf-quic-transport-08", found at tools.ietf.org/html/draft-ietf-quic-transport-11, Oct. 2018, (Year: 2017).*

Coudron, "Networking and Interenet Architecture", Universite Pierre et Marie Curie, Jun. 2016 (Year: 2016).*

Ghedini, "The Road to QUIC", Cludflare, found at blog.cloudfare.com/the-road-to-guic/, Jul. 2018 (Year: 2018).*

Mattieu Coudron, "Nouvelles Approches Pour Les Communications Multichemons, Networking and Internet Architecture", Universite Pierre et Marie Curis-Paris VI, Dec. 12, 2016, pp. 1-263.

Juhyun Choi et al., "Streaming Service Enhancement on QUIC Protocol", Int'l Conf. Internet Computing and Internet of Things, ICOMP'17, ISBN: 1-60132-461-8, CSREA Press ©, Jun. 2017, 2 pages.

Adam Langley et al., "QUIC Crypto", (Revision Dec. 6, 2016.), https://docs.google.comidocument/d/1g5nIXAlkN_Y-7XJW5K45lblHd_L2f5LTaDUDwvZ5L6g/edit, Dec. 6, 2016, 14 pages.

J. Iyengar, Ed. et al., "QUIC: A UDP-Based Multiplexed and Secure Transport", draft-ietf-quic-transport-11, QUIC, Internet-Draft, Intended status: Standards Track, Apr. 17, 2018, 105 pages.

M. Thomson, Ed. et al., "Using Transport Layer Security (TLS) to Secure QUIC", draft-ietf-quit-tls-03, QUIC, Internet-Draft, Intended status: Standards Track, May 21, 2017, 37 pages.

Q. De Coninck et al., "Multipath Extension for QUIC", draft-deconinck-multipath-quic-00, QUIC Working Group, Internet-Draft, Intended status: Standards Track, Oct. 30, 2017, 20 pages.

* cited by examiner

SYSTEMS AND METHODS FOR QUICK USER DATAGRAM PROTOCOL INTERNET CONNECTION (QUIC) WITH MULTIPATH

TECHNICAL FIELD

The present disclosure relates generally to computer network, and more particularly, to Quick User Datagram Protocol Internet Connections (QUIC) with multipath.

BACKGROUND

The Fifth Generation (5G) network is expected to incorporate high mobility standards. However, constantly moving mobile devices are prone to frequent network disconnects. For example, a car traveling at high speeds and streaming in-vehicle videos through 5G would connect to multiple 5G networks for short durations as the car moves from one network coverage area to another. Previously existing systems and methods are inadequate in providing efficient connection switchover without compromising security.

BRIEF DESCRIPTION OF THE DRAWINGS

So that the present disclosure can be understood by those of ordinary skill in the art, a more detailed description can be had by reference to aspects of some illustrative embodiments, some of which are shown in the accompanying drawings.

Figure 1:
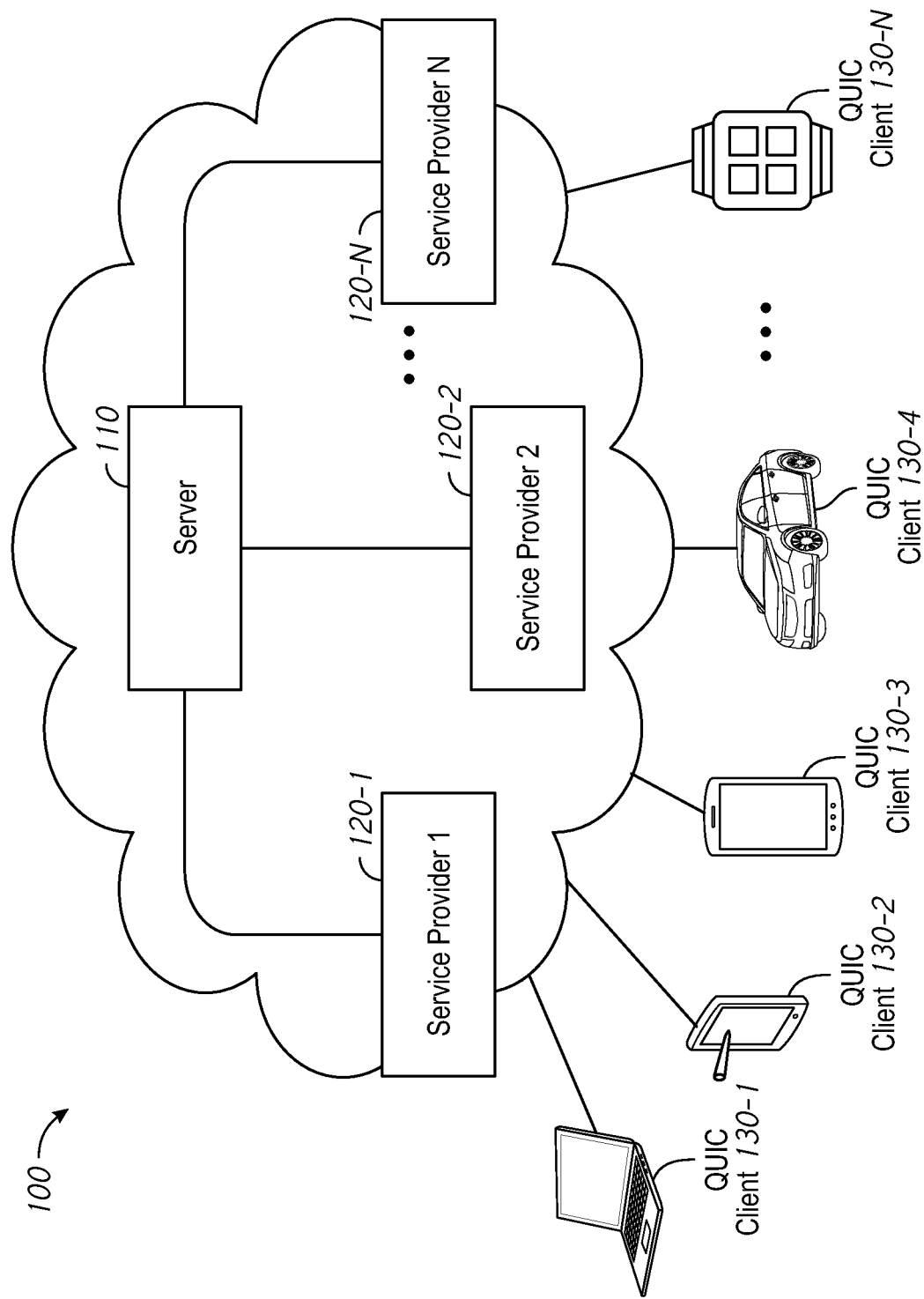
FIG. 1 illustrates an example of a network with multipath in accordance with some implementations.

In accordance with common practice the various features illustrated in the drawings cannot be drawn to scale. Accordingly, the dimensions of the various features can be arbitrarily expanded or reduced for clarity. In addition, some of the drawings cannot depict all of the components of a given system, method or device. Finally, like reference numerals can be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example embodiments described herein.

Overview

Systems and methods of the present disclosure solve the aforementioned problems in 5G networks. Network traffic (e.g., voice and video traffic) is often transmitted using User Datagram Protocol (UDP). Quick UDP Internet Connection (QUIC) is a low-latency Internet transportation protocol (e.g., transport layer protocol) over UDP. Using co-dependent protocols, such as Transport Layer Security (TLS), QUIC was designed to also provide security protection of the voice and video traffic.

Multipath protocols (including QUIC) utilize the presence of multiple network paths between end-hosts in order to provide resistance to failures. For example, if one path of the multiple network paths fails, communications can still continue over the remaining paths. Additional benefits of multipath protocols include reduced latency and reduced overall cost of network transmission. For instance, in order to reduce latency, one originating stream of data can be multiplexed across multiple available paths; and in order to reduce the overall cost, traffic is distributed over less costly paths for network transmission.

Previously existing systems and methods implementing multipath protocols over TCP, e.g., Multipath TCP (MPTCP) and Multipath RTP (MPRTP), perform a make-before-break connection switchover (e.g., setting up a new sub-flow before breaking the existing connection) for smooth transitioning between different paths. QUIC, which runs on UDP, has not defined such techniques. Moreover, for security reason, e.g., reducing the likelihood of a Denial-of-Service (DoS) attack, QUIC servers often restrict and validate incoming packets, such as through token-based source address validation. As a result of the token-based source address validation, such as validating a connection identifier (ConnectionID) mapped to a source IP, a UDP packet for an existing ConnectionID that comes from a different source IP during switchover would be rejected. Thus, seamless switchover without comprising security is difficult to implement in previously existing multipath QUIC systems.

By contrast, systems and methods in accordance with implementations described herein reduce setup time in QUIC with multipath without compromising security. When a QUIC client moves away from a first service provider and moves closer to a second service provider, the QUIC client acquires a new IP address from the second service provider.

In some implementations, in case of make-before-break switchover, the QUIC client advertises its newly acquired IP address and sends a path modification request message to a server (e.g., a content delivery network (CDN) server) over an existing path (e.g., a first path connecting the QUIC client and the CDN server through the first service provider). In some implementations, the path modification request message includes an address validation token (also known as a session token or a token) associated with the existing path. The CDN server receives the new IP advertisement and the path modification request from the QUIC client and validates the token. Upon a successful validation, the CDN server issues a new address validation token associated with a new path (e.g., a second path connecting the QUIC client and the CDN server through the second service provider). The new address validation token is sent in a path modification response message to the QUIC client over the existing path in accordance with some implementations. In some implementations, in case of break-before-make switchover (e.g., not setting up a new path before breaking the existing one), the QUIC client sends a path resume indication message including the address validation token associated with the existing path and the new IP address over the new path. Upon (e.g., in response to) a successful validation, the CDN server issues the new address validation token associated with the new path and sends the new address validation token to the QUIC client over the new path.

In both make-before-break and break-before-make switchover scenarios, the QUIC client can then seamlessly transition to the new network over the new path using the new token. Subsequent connections over the new path do not revalidate the new IP, because path validation is already performed in the existing path. The new path can be used for sending/receiving convent, thereby shortening the new path setup time without comprising security. Relative to previously existing systems and methods, the techniques in accordance with implementations disclosed herein shorten the new path setup time without compromising security. Accordingly, systems and method in accordance with implementations disclosed herein better align with the high mobility standards of 5G with improved efficiency and uncompromised security.

Example Embodiments

FIG. 1 is an illustration of a network 100 with multipath in accordance with some implementations. The network 100 is one example of a suitable operating environment and is not intended to suggest any limitation as to the scope of use or functionality of the present disclosure. Thus, other environments and configurations can be employed without departing from the scope or spirit of the present disclosure.

In some implementations, the network 100 includes a server (e.g., a content delivery network (CDN) server) 110. It should be noted that a CDN server is used as an example of the server 110 hereinafter, and the term "CDN server" and "server" are used interchangeably hereinafter. However, the server 110 is not limited to a CDN server. In addition to being a CDN server, the server 110 can be a server using QUIC, including but not limited to, a Web server, a Web real-time communication (RTC) application server, an FTP server, and/or a sensor data application server (e.g., for IoT, sensor data etc.). It should also be noted that the term "content" as used herein includes but is not limited to motion pictures, movies, videos, music videos, Pay-For-View (PPV) content, Video On Demand (VoD), interactive media, audio files, still images, text, graphics, scripts, applications, and other forms of digital content useable by a computing device. Further, content can include content files themselves independent of format. For example, content can be provided as a Moving Pictures Experts Group (MPEG) content stream or the like. Other examples, without limitation, includes Flash video files (.FLV), Shockwave Flash (.SWF) files, H.263, H.264, Windows Media, Quick Time (QT), Real, or the like.

In some implementations, the CDN 110 server distributes content to a plurality of QUIC client devices (also referred to as QUIC clients, client devices, or clients) 130-1, 130-2, 130-3, 130-4 . . . 130-N (collectively referred to as "client devices 130"). The client devices 130 include network devices capable of receiving content from the CDN 110, e.g., a laptop computer 130-1, a tablet computer 130-2, a smartphone 130-3, a car with wireless interface 130-4, a wearable computing device 130-N, and/or the like. Some of the client devices 130 can connect to the network 100 using a wired communications medium such as personal computers, multiprocessor systems, microprocessor-based or programmable consumer electronics, network PCs, or the like. Some of the client devices 130 can connect to the network 100 using a wireless communications medium such as radio frequency (RF) devices, infrared (IR) devices, Bluetooth devices, integrated devices combining one or more of the preceding devices, or the like. Through wired and/or wireless communication interfaces, the client devices 130 are capable of connecting to the network 100 in order to receive content and play the received content. After received, the content can be played on the client devices 130 using a variety of player components, including, but not limited to, a display device or system, an audio system, a jukebox, set top box (STB), a television, and/or the like.

In some implementations, the server 110 distributes content through a plurality of service providers 120-1, 120-2 . . . 120-N. A service provider 120 can include a cellular service provider, an internet service provider, a wireless access provider, an organization, or other entity/service, through which the plurality of QUIC client devices 130 connect to the network 100 and receive content from the server 110. A respective service provider 120 typically assigns an IP address to a respective client device 130 when the respective client device 130 connects to the respective service provider 120. After connected, the respective service provider 120 establishes a path between the server 110 and the respective client 130 for the content distribution.

As used herein, a path is a logical association between two hosts, over which packets can be sent. In some implementations, a path is identified by a path identifier (e.g., PathID). Unlike TCP, QUIC is not bound to a particular 4-tuple during the lifetime of a connection. A QUIC connection is identified by a ConnectionID, placed in the public header of QUIC packets. This enables hosts to continue the connection even if the 4-tuple changed due to, e.g., NAT rebinding. This ability to shift a connection from one 4-tuple to another is called connection migration. Another of its use cases is failover when the address in use fails but another one is available. A mobile device losing the Wi-Fi connectivity can then continue the connection over its cellular interface. A QUIC connection can thus start on one path and end at another one.

Figure 2:
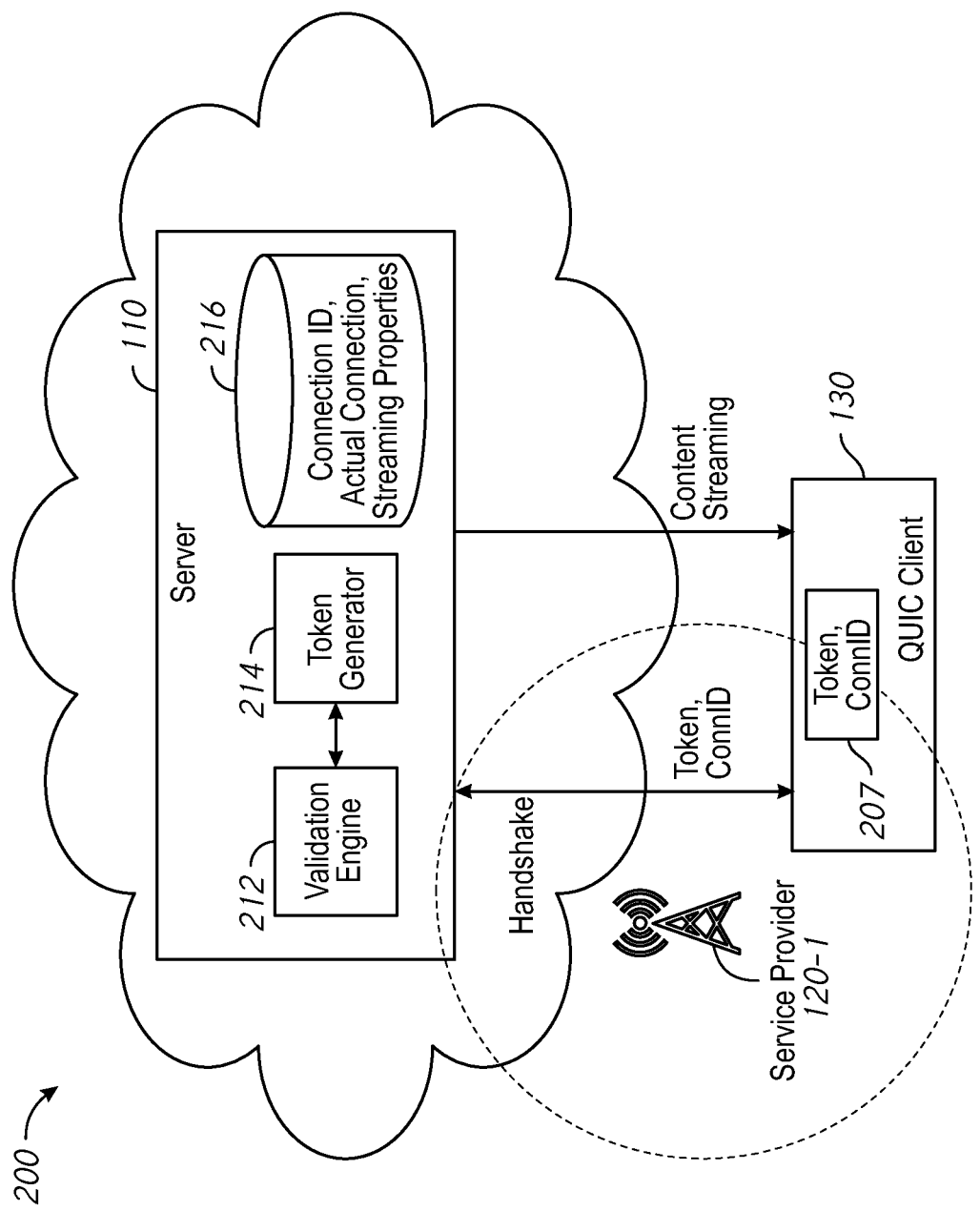
FIG. 2 illustrates an example of an initial path setup in a network using QUIC protocol in accordance with some implementations.

Before multiple paths can be used, the QUIC connection is established. In particular, a multipath QUIC connection starts over an initial path where the cryptographic handshake takes place over a dedicated stream, as shown in FIG. 2 and described below in detail. At a given time, a multipath QUIC connection gathers a set of paths, each denoted by a 4-tuple. The 4-tuple that is associated to a path is not fixed; it may change during the lifetime of a connection. Those changes can be caused by NAT rebindings or handovers, for example. As such, a path is not bound to a particular 4-tuple, and can shift or switch over to another one. Multipath QUIC thus integrates the connection migration ability at the path level, providing the path migration ability. Accordingly, path migration or switchover is used interchangeably with connection migration or switchover herein.

FIG. 2 illustrates an initial path setup in a network 200 using QUIC protocol in accordance with some implementations. In some implementations, the network 200 illustrated in FIG. 2 is similar to and adapted from the network 100 illustrated in FIG. 1. Accordingly, elements common to FIGS. 1 and 2 include common reference numbers, and the differences between FIGS. 1 and 2 are described herein for the sake of brevity.

In FIG. 2, the QUIC client 130 connects to the server 110 through the first service provider 120-1. In some implementations, the QUIC client 130 uses QUIC and a co-dependent transport layer security (TLS) protocol in order to establish a path between the client 130 and the server 110 through the first service provider 120-1. QUIC and TLS protocols are co-dependent, because QUIC uses TLS handshake for security and TLS uses the reliable and ordered delivery provided by QUIC streams to ensure that TLS handshake messages are delivered in the correct order. Further, QUIC uses keys derived from a TLS connection for confidentiality and integrity protection of packets. Thus, QUIC relies on TLS for authentication and negotiation of parameters that are useful for security and performance.

In some implementations, the server 110 includes a validation engine 212 for validation of the client 130 and/or path validation, a token generator 214 for generating address validation tokens, and a datastore 216 for storing mappings of connections and content streaming properties. During a path setup, the validation engine 212 validates the client 130. In response to a successful validation, the validation engine 212 notifies (e.g., requests) the token generator 214 to generate an address validation token. In some implementations, the address validation token includes information about the client address (e.g., IP address and port information) associated with the path, a timestamp, and any other supplementary information, which the server 110 (e.g., the validation engine) utilizes for validation in the future. In some implementations, the address validation token is passed between the server 110 and the client 130 during cryptographic handshake, e.g., over a dedicated stream. In some implementations, upon receiving the token, the client 130 stores the address validation token in a datastore 207. Successful completion of the cryptographic handshake provides proof that the client 130 is legitimate.

In some implementations, at the end of the handshake, the client 130 and the server 110 agree on a connection identifier, e.g., 64-bit ConnectionID, which identifies the connection of the server 110 with the client 130. Upon agreeing on ConnectionID, in some implementations, the client 130 stores ConnectionID in the datastore 207, and the server 110 performs a mapping of ConnectionID to the client's actual connection (e.g., a path connecting the client 130 to the server 110 through the service provider 120-1). Additionally, the server 110 also identifies the state of streaming (e.g., streaming properties/application context like quality, resolution, percentage streamed etc.) over the actual connection. In some implementations, the server 110 then stores in the datastore 216 the mapping of ConnectionID to path properties and/or the state of streaming in order to complete the path setup. Subsequently, the server 110 streams content to the client 130 over the path.

Figure 3A:
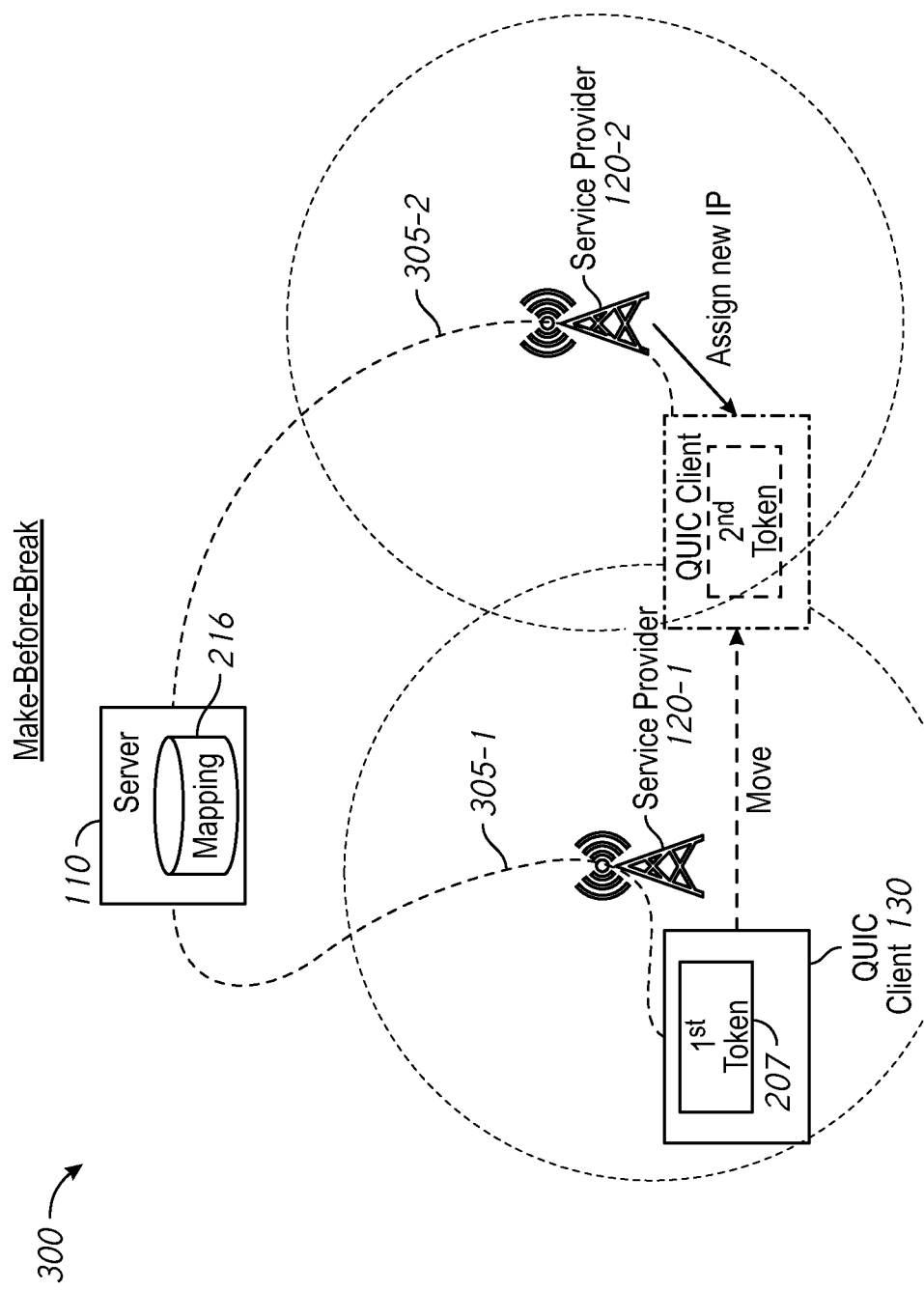
FIGS. 3A-3B illustrate make-before-break switchover in a network in accordance with some implementations.
Figure 3B:
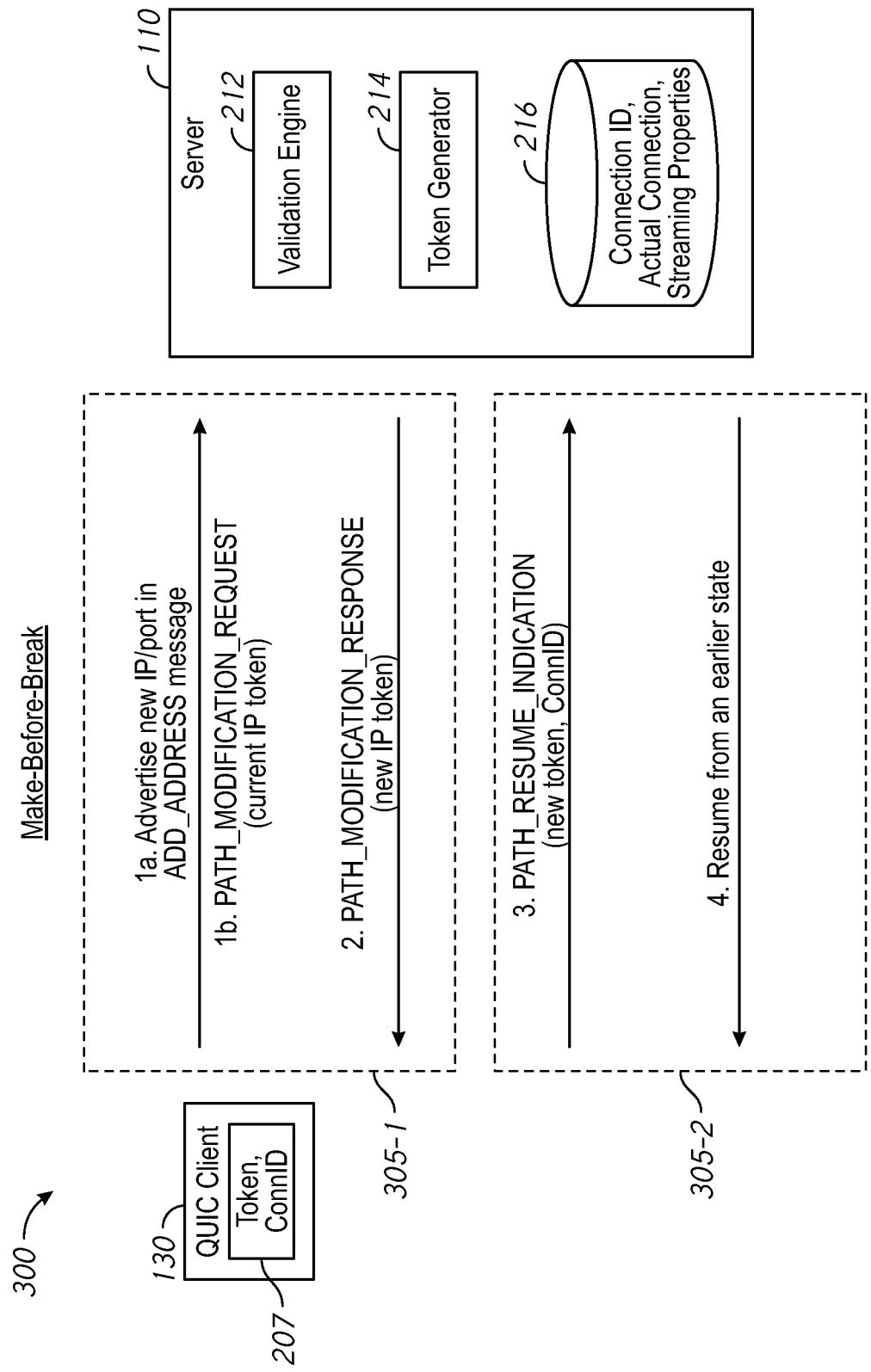

FIGS. 3A-3B are illustrations of make-before-break switchover in a network 300 in accordance with some implementations. In some implementations, the network 300 illustrated in FIGS. 3A and 3B is similar to and adapted from the networks 100 and 200 illustrated in FIGS. 1 and 2. Accordingly, elements common to FIGS. 1 and 2 include common reference numbers, and the differences between FIGS. 3A-3B and FIGS. 1 and 2 are described herein for the sake of brevity.

In some implementations, following the procedure described above with reference to FIG. 2, the QUIC client 130 first sets up a first path (also referred to a current path or an existing path) 305-1 leading to the server 110 through the first service provider 120-1. Once the first path 305-1 is established, the client 130 and the server 110 agree on a ConnectionID that identifies the connection of the server 110 with the client 130 over the first path 305-1. Further, as explained above with reference to FIG. 2, in some implementations, the server 110 issues a first address validation token (also referred to as a current address validation token or a current IP token) upon a successful validation of the first path 305-1 and stores the mapping of ConnectionID to the client's actual connection (e.g., path properties associated with the path 305-1) and streaming properties/application context (e.g., quality, resolution, percentage streamed etc. over the path 305-1) in the datastore 216. Additionally, as explained above with reference to FIG. 2, in some implementations, the client 130 stores the first address validation token along with ConnectionID in the datastore 207.

When the QUIC client 130 moves to a different coverage area, e.g., as indicated by the dotted arrow to a coverage area associated with the second service provider 120-2, the QUIC client 130 acquires a new IP address from the second service provider 120-2. Further, the QUIC client 130 executes a make-before-break connection switchover in order to continue the content streaming over the new path 305-2 as shown in FIG. 3B.

In FIG. 3B, the client 130 first advertises its new interface and/or address in step 1a. In some implementations, the advertisement is included in an ADD_ADDRESS frame message and protected by the QUIC/TLS crypto, so that on-path attackers cannot modify the message. In some implementations, the client 130 also retrieves the current address validation token associated with the first path 305-1 from the datastore 207 and sends the current address validation token to the server 110 in step 1b. In some implementations, the current address validation token is included in a PATH_MODIFICATION_REQUEST message in step 1b.

Once the server 110 receives the current address validation token over the first path 305-1, the validation engine 212 on the server 110 validates the current address validation token. Further, in some implementations, the validation engine 212 validates the new IP address in the ADD_ADDRESS message. Upon a successful validation, the validation engine 212 notifies the token generator 214 to issue a second address validation token (also referred to as a new address validation token or a new IP token) for the new IP address specified in the ADD_ADDRESS message. In some implementations, the server 110 sends to the client 130 a response message including the new address validation token in step 2. In some implementations, the new address validation token is included in a PATH_MODIFICATION_RESPONSE. As indicated by the first dotted box, the ADD_ADDRESS message, PATH_MODIFICATION_REQUEST, and PATH_MODIFICATION_RESPONSE are sent over the existing path 305-1 in accordance with some implementations. In some implementations, after the server 110 acknowledges the path modification request in step 2, it continues to receive packets on the first path 305-1 for a duration (e.g., predetermined and/or configurable) and then abandons further packets received over the first path 305-1.

In some implementations, after receiving PATH_MODIFICATION_RESPONSE over the old path 305-1, the client 130 sends the new address validation token included a PATH_RESUME_INDICATION as the first message over the new path 305-2 in step 3. The PATH_RESUME_INDICATION message over the new path 305-2 indicates that the client is ready to connect over the new path 305-2. In some implementations, the new connection is associated with the new address validation token and the same ConnectionID. In some implementations, the validation engine 212 checks the PATH_RESUME_INDICATION frame and validates the new address validation token included in the PATH_RESUME_INDICATION frame. Upon a successful validation, the server 110 uses ConnectionID extracted from the PATH_RESUME_INDICATION frame to fetch the streaming properties/application context from the datastore 216 and resumes content delivery from an earlier state (e.g., through TLS resume) in step 4 in accordance with the retrieved streaming properties/application context retrieved from the datastore 216. In some implementations, the server 110 optionally generates a new sub-flow ConnectionID for the new path 305-2. In such implementations, the server 214 inserts a sub-entry in the datastore 216 in addition to the primary ConnectionID entry.

Figure 4A:
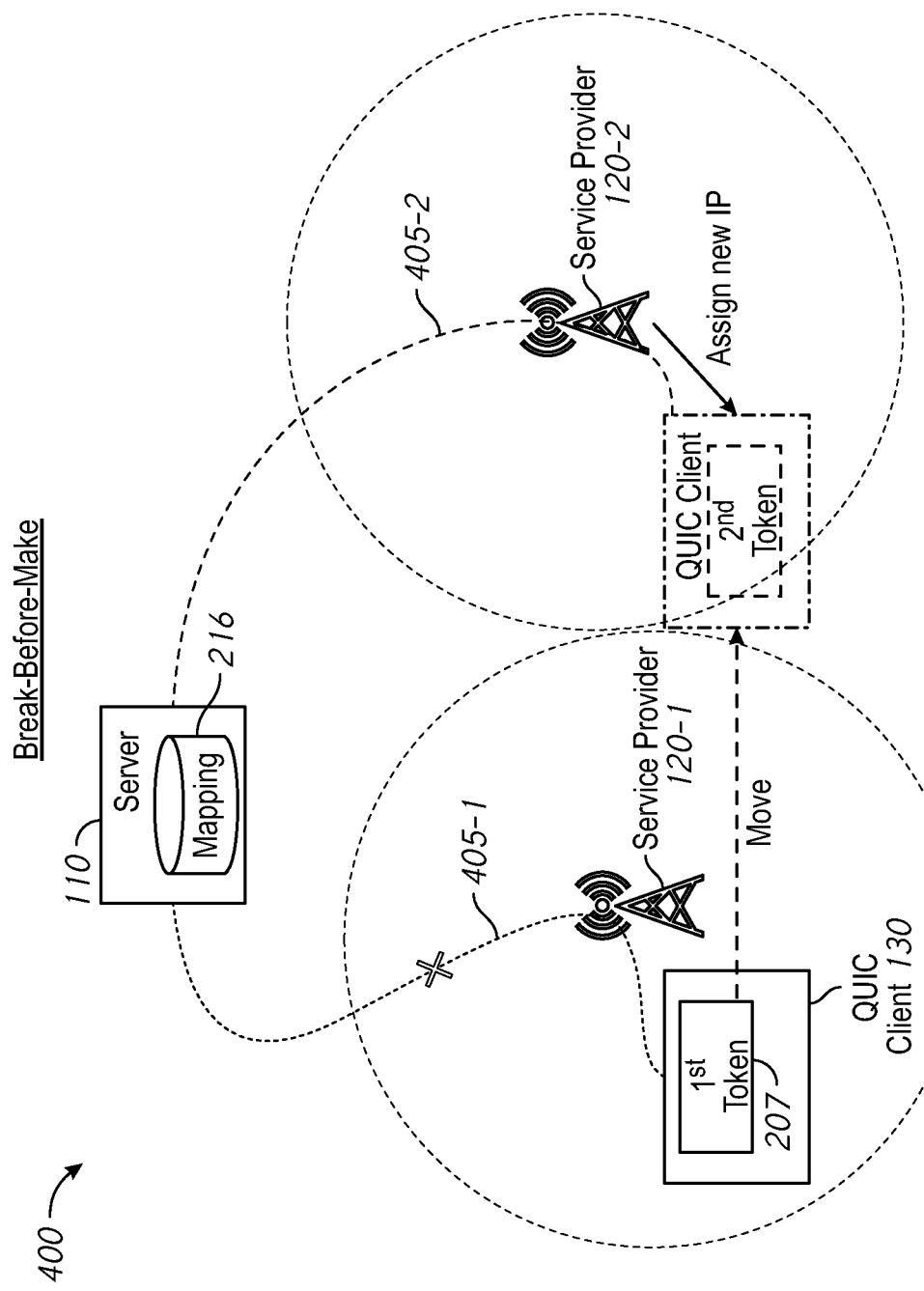
FIGS. 4A-4B illustrate break-before-make switchover in a network in accordance with some implementations.
Figure 4B:
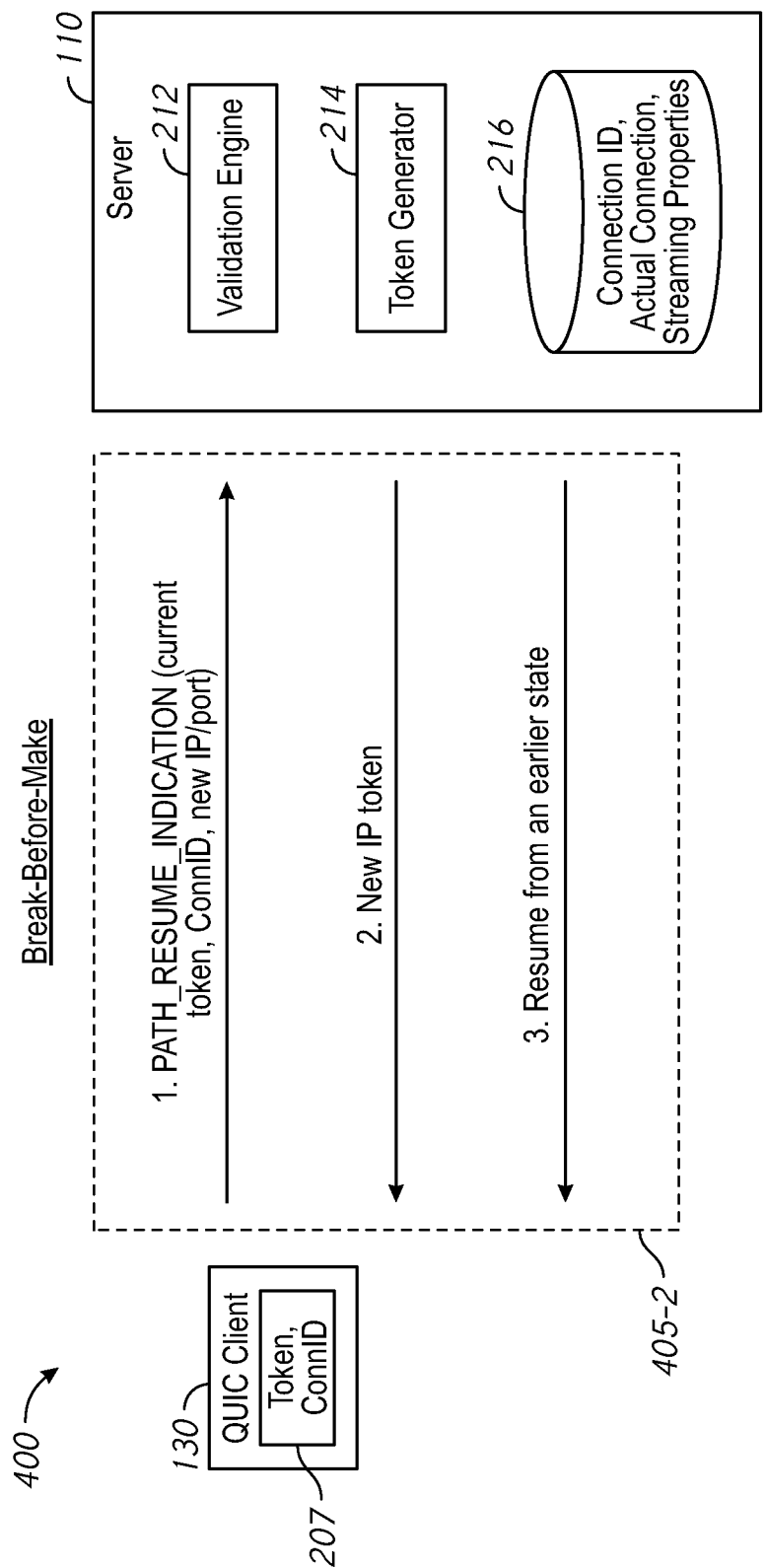

FIGS. 4A-4B are illustrations of break-before-make switchovers in a network 400 in accordance with some implementations. In some implementations, the network 400 illustrated in FIGS. 4A and 4B is similar to and adapted from the networks 100 and 200 illustrated in FIGS. 1 and 2. Accordingly, elements common to FIGS. 1 and 2 include common reference numbers, and the differences between FIGS. 1 and 2 are described herein for the sake of brevity.

In some implementations, following the procedure described above with reference to FIG. 2, the QUIC client 130 first sets up a first path (also referred to a current path or an existing path) 405-1 leading to the server 110 through the first service provider 120-1. Once the first path 405-1 is established, the client 130 and the server 110 agree on a ConnectionID that identifies the connection of the server 110 with the client 130 over the first path 405-1. Further, as explained above with reference to FIG. 2, in some implementations, the server 110 issues a first address validation token (also referred to as a current address validation token or a current IP token) upon a successful validation of the first path 405-1 and stores in the datastore 216 the mapping of ConnectionID to the client's actual connection (e.g., path properties associated with the path 405-1) and streaming properties/application context (e.g., quality, resolution, percentage streamed etc. over the path 405-1). Additionally, as explained above with reference to FIG. 2, in some implementations, the client 130 stores the first address validation token along with ConnectionID in the datastore 207.

In some cases, the make-before-break switchover as illustrated in FIG. 3A is not viable or possible. For example, the existing network path 305-1 may deteriorate to the point of breaking or dropping as the client 130 moves away from the coverage area associated with the first service provider 120-1. In FIG. 4A, as indicated by the cross on the existing network path 405-1, before the client 130 connects to a new path 405-2, the existing path 405-1 breaks. In some implementations, as the QUIC client 130 moves into a coverage area associated with the second service provider 120-2, the QUIC client 130 acquires a new IP address from the second service provider 120-2 and executes a break-before-make connection switchover to continue the content streaming, as shown in FIG. 4B.

In FIG. 4B, during the switchover, the QUIC client 130 retrieves the address validation token associated with the path 405-1 from the datastore 207 and sends the original address validation token from the new path 405-2 to the server 110 in step 1. In some implementations, the original address validation token is sent in a PATH_RESUME_INDICATION message over the new path 405-2. In some implementations, the PATH_RESUME_INDICATION message includes ConnectionID and a field ORIGINAL_SOURCE_ADDRESS_TOKEN, which further includes the original address validation token. Because path validation was already performed when establishing the path 405-1 (e.g., during the handshake as shown in FIG. 2) and the new path 405-2 is used for sending data, the new path 405-2 setup in accordance with implementations described herein saves round-trip time (RTT). In some implementations, for increased security, the address validation token is encrypted using TLS session key acquired during the initial setup of the existing path. As such, relative to previously existing QUIC multipath systems and methods, the switchover in accordance with implementations described herein reduces setup time without comprising security.

When the server 110 receives the PATH_RESUME_INDICATION, it validates the original address validation token. Upon a successful validation, the server 110 issues a new address validation token (also referred to as a new IP token or a new token) for the new path 405-2 in step 2. Subsequent packets from client 130 would carry the new address validation token to indicate that client 130 has received the new token and the client 130 is legitimate. The server 110 further uses ConnectionID extracted from the PATH_RESUME_INDICATION frame in order to fetch the streaming properties/application context from the datastore 216 and resumes content delivery from an earlier state in step 3 in accordance with the retrieved streaming properties/application context.

The systems and methods in accordance with implementations described herein reduce the RTT for setting up and validating a new path. In previously existing systems and methods, a new path setup typically takes 2-RTT, e.g., 1-RTT for exchanging PATH_CHALLENGE AND PATH_RESPONSE messages and 1-RTT for the server providing a new address validation token using NewSessionTicket message, where messages exchanged during these 2-RTT are over the new path. By contrast, in accordance with implementations described herein, since path validation is already performed in the existing path, the new path can start accepting packets without going through 2-RTT for the new path validation. The savings in RTT are impactful for short duration paths on moving and/or roaming devices, e.g., IoT devices. Further, as the same ConnectionID is used for both the existing path and the new path, the QUIC server would not reject the connection from a source with a different IP address. For QUIC clients that move across networks frequently (e.g., IoT devices, cars etc.), the smooth transition to the new path improves video streaming quality and quality of user experience.

Figure 5:
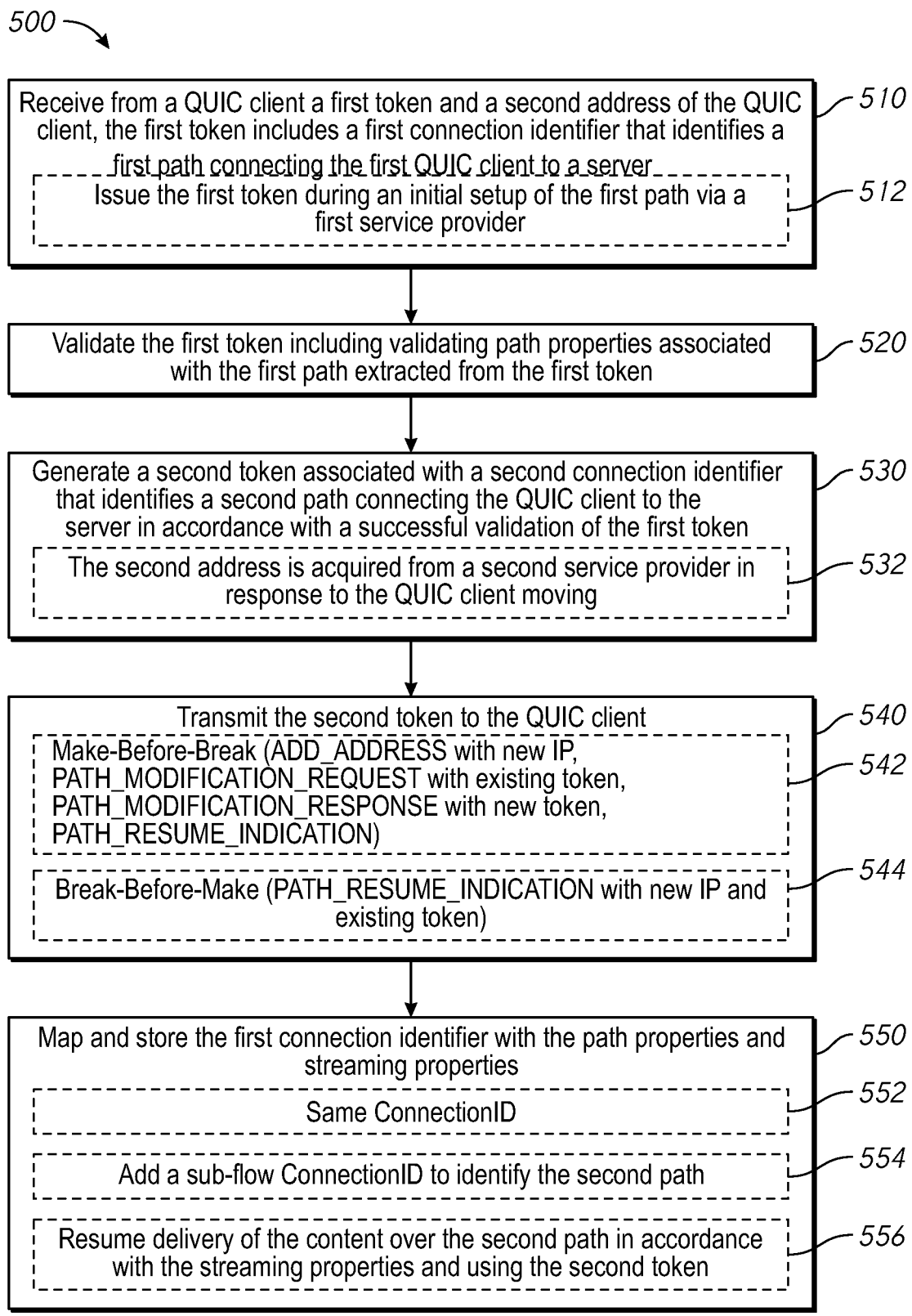
FIG. 5 is a flowchart illustrating a method of path migration in QUIC with multipath in accordance with some implementations.

FIG. 5 is a flowchart illustrating a method 500 of path migration in QUIC with multipath in accordance with some implementations. In some implementations, the method 500 is performed at a server (e.g., the server 110 in FIGS. 1-2, 3A-3B, and 4A-4B and/or a content delivery network (CDN) server). In some implementations, the method 500 is performed by processing logic, including hardware, firmware, software, or a combination thereof. In some implementations, the method 500 is performed by one or more processors, one or more controllers, and/or one or more circuitries executing codes stored in a non-transitory computer-readable medium (e.g., a non-transitory memory).

Beginning at block 510 of FIG. 5, the method 500 includes receiving from a QUIC client a first token and a second address of the QUIC client, where the first token includes a first connection identifier that identifies a first path connecting the QUIC client to the server. In some implementations, as represented by block 512, the server issues the first token during an initial setup of the first path between the CDN server and the QUIC client via a first service provider. For example, as shown in FIG. 2, the server 110 validates the source address of the QUIC client 130 via handshake during the initial path setup. At the end of the initial setup, the server 110 issues a token to the QUIC client 130 and the server 110 and the QUIC client 130 agree to a ConnectionID that identifies the path for the content streaming to the QUIC client 130. For example, as shown in FIG. 3A or 4A, during the initial setup of the first path 305-1 or 405-1, the server 110 issues the first token for the first path 305-1 or 405-1.

The method 500 continues, as represented by block 520, with the server validating the first token, including validating path properties associated with the first path extracted from the first token. For example, in some implementations, the server validates information about the QUIC client address (IP and port), timestamp etc. extracted from the first token issued during the initial setup of the first path 305-1 (FIG. 3A) or 405-1 (FIG. 4A). As represented by block 530, in accordance with a successful validation of the first token, the server generates a second token associated with a second connection identifier that identifies a second path connecting the QUIC client to the server. For example, in FIG. 3A or 4A, the second token is generated by the server 110 in accordance with a successful validation of the first token.

In some implementations, as represented by block 532, the first path connects the QUIC client to the server via a first service provider with a first coverage area; the second path connects the QUIC client to the server via a second service provider with a second coverage area; and the second address of the QUIC client is acquired from the second service provider in response to the QUIC client moving into the second coverage area and moving away from the first coverage area. For instance, in FIG. 3A or 4A, as the QUIC client 130 moves away from the first coverage area associated with the first service provider 120-1 and moves into the second coverage area associated with the second service provider 120-2, the second service provider 120-2 assigns a new IP address to the QUIC client 130. In other words, the second address (e.g. the new IP address) of the QUIC client 130 is acquired from the second service provider 120-2 in response to the QUIC client 130 moving away from the first service provider 120-1 and moving closer to the second service provider 120-2.

Continuing with the method 500, as represented by block 540, the server transmits the second token to the QUIC client. In some implementations, in case of make-before-break switchover, as represented by block 542, ADD_ADDRESS, PATH_MODIFICATION_REQUEST, PATH_MODIFICATION_RESPONSE, and PATH_RESUME_INDICATION messages are exchanged. For example, as shown in FIG. 3B, the second address (e.g., the new IP address) is included in an ADD_ADDRESS message received from the QUIC client 130 over the first path 305-1 in step 1a. Further, as shown in FIG. 3B, the server 110 receives the first token (e.g., the existing token) included in a PATH_MODIFICATION_REQUEST message over the first path 305-1 in step 1b, and transmits the second token (e.g., the new token) included in a PATH_MODIFICATION_RESPONSE message over the first path 305-1 in step 2. Additionally, the server 110 receives a PATH_RESUME_INDICATION message encapsulating the second token over the second path 305-2 in step 3 of FIG. 3B in preparation for the token validation by the validation engine 212 of the server 110.

In some implementations, in case of break-before-make switchover, as represented by block 544, receiving from the QUIC client the first token includes receiving the first token included in a PATH_RESUME_INDICATION message over the second path, and transmitting the second token to the QUIC client includes transmitting the second token over the second path. For example, in FIG. 4B, in step 1, the client 130 sends the PATH_RESUME_INDICATION message to the server 110 over the new path 405-2, and the PATH_RESUME_INDICATION includes at least the current token associated with the broken path 405-1 (FIG. 4A) and the ConnectionID for the broken path 405-1 and the new IP address and/or port information associated with the new path 405-1.

Still referring to FIG. 5, in some implementations, the method 500 further includes mapping the first connection identifier to the path properties associated with the first path and streaming properties/application context of content delivered to the QUIC client over the first path; storing an entry identifying mapping of the first connection identifier to the path properties associated with the first path and the streaming properties; and mapping the second connection identifier to path properties associated with the second path and the streaming properties. For instance, as shown in FIG. 2, the ConnectionID is mapped to properties of the actual connection between the server 110 and the QUIC client 130. For example, in some implementations, IP address/port of the QUIC client 130 is connected to the server 110 through the service provider 120-1. Further, the ConnectionID is mapped to the streaming properties (e.g., quality, resolution, percentage streamed, etc.) of the content streaming from the server 110 to the QUIC client 130. In some implementations, the mapping is stored in the datastore 216 of the server 110.

Once the QUIC client switches to a different path connecting the QUIC client to the CDN sever, a ConnectionID is mapped to the path properties associated with the second path. In some implementations, as represented by block 552, the first connection identifier identifying the first path is the same as the second connection identifier identifying the second path. In other words, the same ConnectionID is used for multiple paths connecting the server 110 and the QUIC client 130. In such implementations, the server updates the ConnectionID entry with mapping of the second connection identifier to the path properties associated with the second path. For example, in FIG. 3A or 4A, the ConnectionID entry associated with the first path 305-1 or 405-1 stored in the datastore 216 would be updated to reflect new path properties of the second path 305-2 or 405-2. In some implementations, the second connection identifier is different from the first connection identifier. For example, in FIG. 3A or 4A, the server 110 can optionally generate a new sub-flow ConnectionID for the new path 305-2 or 405-2. In such implementations, the server 110 can add a sub-entry to the primary ConnectionID entry, and the sub-entry represents mapping of the second connection identifier to the path properties associated with the second path 305-2 or 405-2.

Referring back to FIG. 5, in some implementations, the method 500 further includes delivering the content over the first path to the QUIC client; obtaining the streaming properties of the content; and resuming delivery of the content over the second path in accordance with the streaming properties and using the second token. For example, in FIG. 3B or 4B, the server 110 checks the PATH_RESUME_INDICATION message and validates the address validation token received over the new path 305-2 or 405-2. In response to a successful validation of the new token, the server 110 resumes content streaming over the new path 305-2 or 405-2. For example, the server 110 uses the ConnectionID in order to fetch the application context and/or streaming properties from the datastore 216 and resumes content delivery according to the application context and/or streaming properties. In some implementations, the CDN continues processing a first set of packets received from the QUIC client over the first path for a threshold duration and ceasing processing a second set of packets received from the QUIC client over the first path after the threshold duration. For example, in FIG. 3A or 4A, the server 110 can continue to receive packets on the first path 305-1 or 405-1 for a short duration and then abandon further packets on the first path 305-1 or 405-1.

Figure 6:
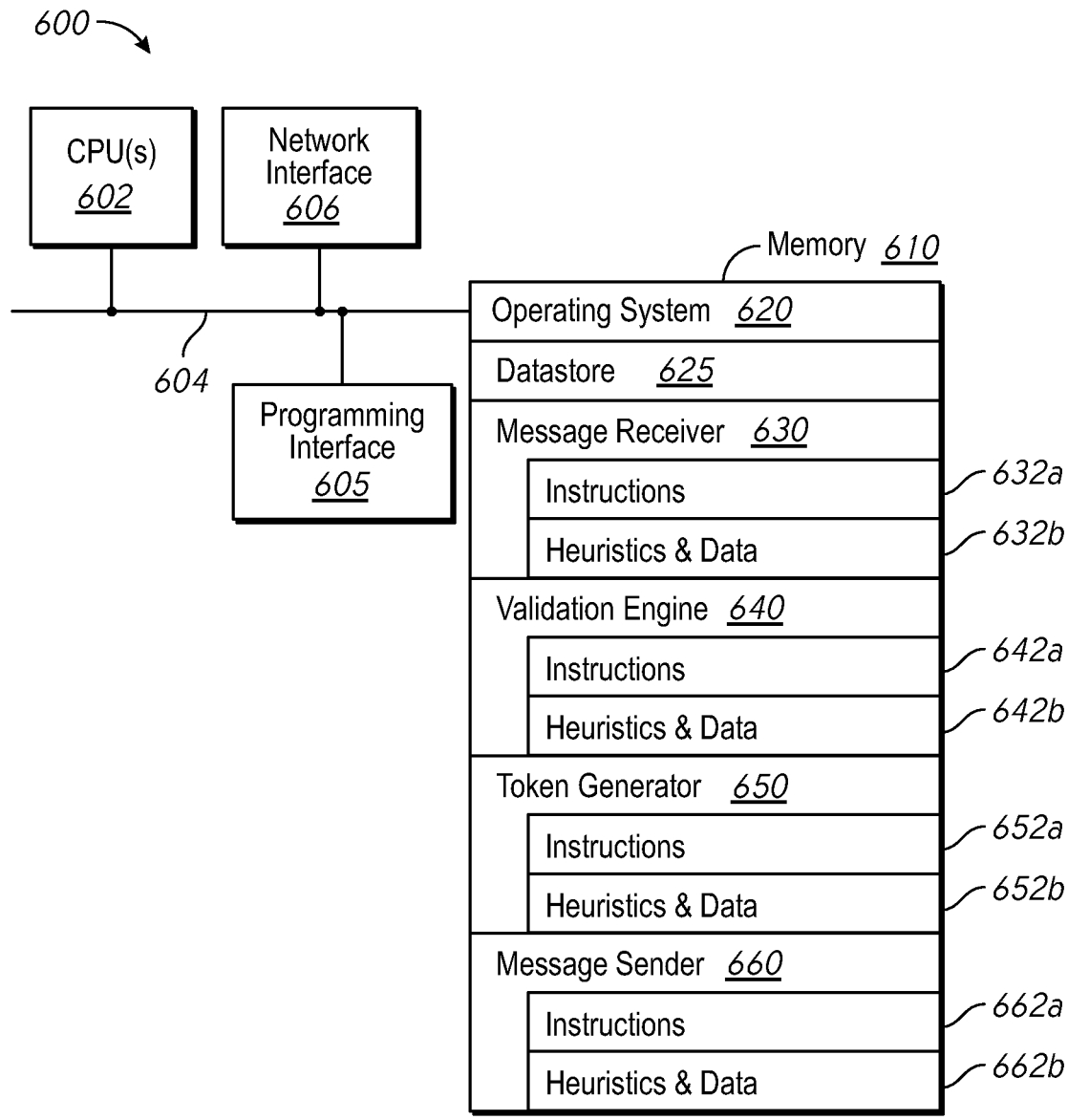
FIG. 6 is a block diagram of a networking device in accordance with some implementations.

FIG. 6 is a block diagram of a computing device 600 in accordance with some implementations. In some implementations, the computing device 600 corresponds to the server 110 in FIGS. 1-2, 3A-3B, and 4A-4B, and performs one or more of the functionalities described above. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some implementations, the networking device 600 includes one or more processing units (CPUs) 602 (e.g., processors), one or more network interfaces 606, a memory 610, a programming interface 605, and one or more communication buses 604 for interconnecting these and various other components.

In some implementations, the communication buses 604 include circuitry that interconnects and controls communications between system components. The memory 610 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 610 optionally includes one or more storage devices remotely located from the CPU(s) 602. The memory 610 comprises a non-transitory computer readable storage medium. Moreover, in some implementations, the memory 610 or the non-transitory computer readable storage medium of the memory 610 stores the following programs, modules and data structures, or a subset thereof including an optional operating system 620, a datastore 625, a message receiver 630, a validation engine 640, a token generator 650, and a message sender 660. In some implementations, one or more instructions are included in a combination of logic and non-transitory memory. The operating system 620 includes procedures for handling various basic system services and for performing hardware dependent tasks.

In some implementations, the datastore 625 (e.g., the datastore 216 in FIGS. 2, 3B, and 4B) stores the mapping between a respective ConnectionID of a connection and path properties and streaming properties/application context associated with the connection, e.g., the datastore 216 in FIGS. 2, 3A-3B, and 4A-4B.

In some implementations, the message receiver 630 is configured to receive a message (e.g., receiving the ADD_ADDRESS, PATH_MODIFICATION_REQUEST, PATH_RESUME_INDICATION messages in FIG. 3B and/or FIG. 4B) over the network interface 606. To that end, the message receiver 630 includes a set of instructions 632a and heuristics and data 632b.

In some implementations, the validation engine 640 (e.g., the validation engine 212 in FIGS. 2, 3B, and 4B) is configured to validate information in the received messages, e.g., validating the source address in the address validation token in the PATH_MODIFICATION_REQUEST, PATH_RESUME_INDICATION messages in FIG. 3B and/or FIG. 4B. To that end, the validation engine 640 includes a set of instructions 642a and heuristics and data 642b.

In some implementations, the token generator 650 (e.g., the token generator 214 in FIGS. 2, 3B, and 4B) is configured to generate a token in response to a successful validation by the validation engine 640. To that end, the token generator 650 includes a set of instructions 652a and heuristics and data 652b.

In some implementations, the message sender 660 is configured to transmit a message (e.g., sending the PATH_MODIFICATION_RESPONSE message in FIG. 3B, sending a message encapsulating the new token in FIG. 4B, or sending frames for the content streaming in FIGS. 2, 3B, and 4B) over the network interface 606. To that end, the message sender 660 includes a set of instructions 662a and heuristics and data 662b.

Although the datastore 625, message receiver 630, validation engine 640, token generator 650, and message sender 660 are illustrated as residing on a single networking device 600, it should be understood that in other embodiments, any combination of the datastore 625, message receiver 630, validation engine 640, token generator 650, and message sender 660 are illustrated as residing on a single networking device 600 can reside in separate computing devices in various implementations. For example, in some implementations, each of the datastore 625, message receiver 630, validation engine 640, token generator 650, and message sender 660 illustrated as residing on a single networking device 600 resides on a separate computing device.

Moreover, FIG. 6 is intended more as a functional description of the various features that are present in a particular implementation as opposed to a structural schematic of the embodiments described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

Figure 7:
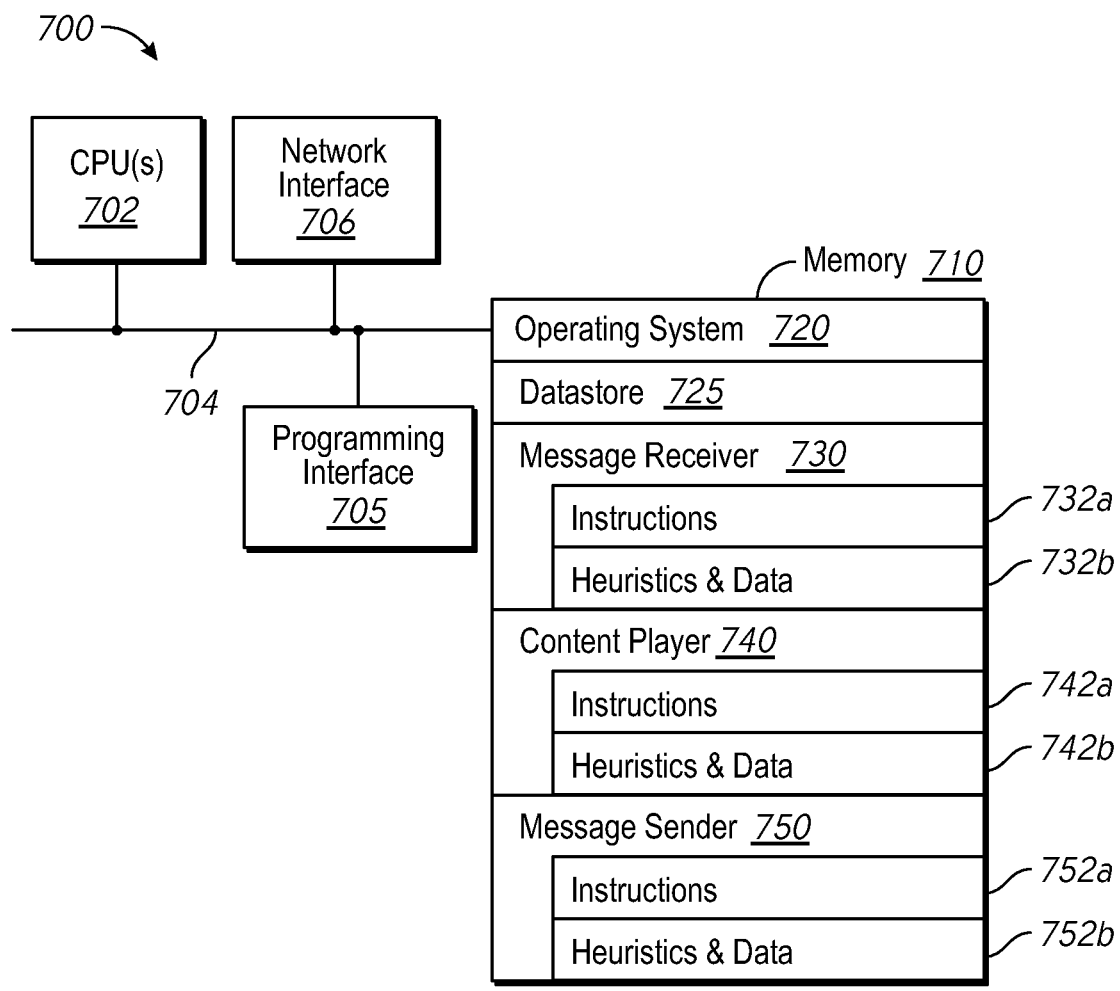
FIG. 7 is a block diagram of another networking device in accordance with some implementations.

FIG. 7 is a block diagram of a computing device 700 in accordance with some implementations. In some implementations, the computing device 700 corresponds to the QUIC client device 130 in FIGS. 1-2, 3A-3B, and 4A-4B, and performs one or more of the functionalities described above. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some implementations, the networking device 700 includes one or more processing units (CPUs) 702 (e.g., processors), one or more network interfaces 706, a memory 710, a programming interface 705, and one or more communication buses 704 for interconnecting these and various other components.

In some implementations, the communication buses 704 include circuitry that interconnects and controls communications between system components. The memory 710 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 710 optionally includes one or more storage devices remotely located from the CPU(s) 702. The memory 710 comprises a non-transitory computer readable storage medium. Moreover, in some implementations, the memory 710 or the non-transitory computer readable storage medium of the memory 710 stores the following programs, modules and data structures, or a subset thereof including an optional operating system 720, a datastore 725, a message receiver 730, a content player 740, and a message sender 750. In some implementations, one or more instructions are included in a combination of logic and non-transitory memory. The operating system 720 includes procedures for handling various basic system services and for performing hardware dependent tasks.

In some implementations, the datastore 725 stores the address validation token and/or ConnectionID, e.g., the datastore 207 in FIGS. 2, 3A-3B, and 4A-4B.

In some implementations, the message receiver 730 is configured to receive a message (e.g., receiving the PATH_MODIFICATION_RESPONSE message in FIG. 3B, receiving a message encapsulating the new token in FIG. 4B, or receiving frames for the content streaming in FIGS. 2, 3B, and 4B) over the network interface 706. To that end, the message receiver 730 includes a set of instructions 732a and heuristics and data 732b.

In some implementations, the content player 740 is configured to play content. To that end, the content player 740 includes a set of instructions 742a and heuristics and data 742b.

In some implementations, the message sender 750 is configured to transmit a message (e.g., sending the ADD_ADDRESS, PATH_MODIFICATION_REQUEST, PATH_RESUME_INDICATION messages in FIG. 3B and/or FIG. 4B) over the network interface 706. To that end, the message sender 750 includes a set of instructions 752a and heuristics and data 752b.

Although the datastore 725, message receiver 730, content player 740, and message sender 750 are illustrated as residing on a single networking device 700, it should be understood that in other embodiments, any combination of the datastore 725, message receiver 730, content player 740, and message sender 750 are illustrated as residing on a single networking device 700 can reside in separate computing devices in various implementations. For example, in some implementations, each of the datastore 725, message receiver 730, content player 740, and message sender 750 illustrated as residing on a single networking device 700 resides on a separate computing device.

Moreover, FIG. 7 is intended more as a functional description of the various features that are present in a particular implementation as opposed to a structural schematic of the embodiments described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

Note that the components and techniques shown and described in relation to the separate figures can indeed be provided as separate components and techniques, and alternatively one or more (or all of) the components and techniques shown and described in relation to the separate figures are provided together for operation in a cooperative manner.

While various aspects of embodiments within the scope of the appended claims are described above, it should be apparent that the various features of embodiments described above can be embodied in a wide variety of forms and that any specific structure and/or function described above is merely illustrative. Based on the present disclosure one skilled in the art should appreciate that an aspect described herein can be implemented independently of any other aspects and that two or more of these aspects can be combined in various ways. For example, an apparatus can be implemented and/or a method can be practiced using any number of the aspects set forth herein. In addition, such an apparatus can be implemented and/or such a method can be practiced using other structure and/or functionality in addition to or other than one or more of the aspects set forth herein.

It will also be understood that, although the terms "first," "second," etc. can be used herein to describe various elements, these elements should not be limited by these terms. These terms are only used to distinguish one element from another. For example, a first spine switch could be termed a second spine switch, and, similarly, a second spine switch could be termed a first spine switch, which changing the meaning of the description, so long as all occurrences of the "first spine switch" are renamed consistently and all occurrences of the second spine switch are renamed consistently. The first spine switch and the second spine switch are both spine switches, but they are not the same spine switch.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The invention claimed is:

1. A method comprising:
    at a server including one or more processors and a non-transitory memory:
    receiving from a Quick User Datagram Protocol (UDP) Internet Connection (QUIC) client a first token and an address of the QUIC client, wherein the first token includes a first connection identifier that identifies a first path connecting the QUIC client to the server;

validating the first token, including validating path properties associated with the first path extracted from the first token;
generating a second token associated with a second connection identifier that identifies a second path connecting the QUIC client to the server in accordance with a successful validation of the first token; and
transmitting the second token to the QUIC client.

2. The method of claim 1, further comprising issuing the first token during an initial setup of the first path between the server and the QUIC client via a first service provider.

3. The method of claim 1, wherein:
the first path connects the QUIC client to the server via a first service provider with a first coverage area;
the second path connects the QUIC client to the server via a second service provider with a second coverage area; and
the address of the QUIC client is acquired from the second service provider in response to the QUIC client moving into the second coverage area and moving away from the first coverage area.

4. The method of claim 1, wherein the address is included in an ADD_ADDRESS message received from the QUIC client over the first path.

5. The method of claim 1, wherein:
receiving from the QUIC client the first token includes receiving the first token included in a PATH_MODIFICATION_REQUEST message over the first path;
transmitting the second token to the QUIC client includes transmitting the second token included in a PATH_MODIFICATION_RESPONSE message over the first path; and
the method further includes receiving a PATH_RESUME_INDICATION message encapsulating the second token over the second path.

6. The method of claim 1, wherein receiving from the QUIC client the first token includes receiving the first token included in a PATH_RESUME_INDICATION message over the second path, and transmitting the second token to the QUIC client includes transmitting the second token over the second path.

7. The method of claim 1, further comprising:
mapping the first connection identifier to the path properties associated with the first path and streaming properties of content delivered to the QUIC client over the first path;
storing an entry identifying mapping of the first connection identifier to the path properties associated with the first path and the streaming properties; and
mapping the second connection identifier to path properties associated with the second path and the streaming properties.

8. The method of claim 7, wherein the first connection identifier is the same as the second connection identifier, and the method further includes:
updating the entry with mapping of the second connection identifier to the path properties associated with the second path.

9. The method of claim 7, wherein the second connection identifier is different from the first connection identifier, and the method further includes:
adding a sub-entry to the entry with mapping of the second connection identifier to the path properties associated with the second path.

10. The method of claim 7, further comprising:
delivering the content over the first path to the QUIC client;
obtaining the streaming properties of the content; and
resuming delivery of the content over the second path in accordance with the streaming properties and using the second token.

11. The method of claim 1, further comprising continuing processing a first set of packets received from the QUIC client over the first path for a threshold duration and ceasing processing a second set of packets received from the QUIC client over the first path after the threshold duration.

12. A device comprising:
one or more processors;
a non-transitory memory coupled to the one or more processors; and
one or more programs stored in the non-transitory memory, which, when executed by the one or more processors, cause the device to:
receive from a Quick User Datagram Protocol (UDP) Internet Connection (QUIC) client a first token and an address of the QUIC client, wherein the first token includes a first connection identifier that identifies a first path connecting the QUIC client to the device;
validate the first token, including validating path properties associated with the first path extracted from the first token;
generate a second token associated with a second connection identifier that identifies a second path connecting the QUIC client to the device in accordance with a successful validation of the first token; and
transmit the second token to the QUIC client.

13. The device of claim 12, wherein:
the first path connects the QUIC client to the device via a first service provider with a first coverage area;
the second path connects the QUIC client to the device via a second service provider with a second coverage area; and
the address of the QUIC client is acquired from the second service provider in response to the QUIC client moving into the second coverage area and moving away from the first coverage area.

14. The device of claim 12, wherein the address is included in an ADD_ADDRESS message received from the QUIC client over the first path.

15. The device of claim 12, wherein:
receiving from the QUIC client the first token includes receiving the first token included in a PATH_MODIFICATION_REQUEST message over the first path;
transmitting the second token to the QUIC client includes transmitting the second token included in a PATH_MODIFICATION_RESPONSE message over the first path; and
the one or more programs further cause the device to receive a PATH_RESUME_INDICATION message encapsulating the second token over the second path.

16. The device of claim 12, wherein receiving from the QUIC client the first token includes receiving the first token included in a PATH_RESUME_INDICATION message over the second path, and transmitting the second token to the QUIC client includes transmitting the second token over the second path.

17. The device of claim 12, the one or more programs further cause the device to:
map the first connection identifier to the path properties associated with the first path and streaming properties of content delivered to the QUIC client over the first path;

store an entry identifying mapping of the first connection identifier to the path properties associated with the first path and the streaming properties; and map the second connection identifier to path properties associated with the second path and the streaming properties.

18. The device of claim 17, wherein the first connection identifier is the same as the second connection identifier, and the one or more programs further cause the device to:

update the entry with mapping of the second connection identifier to the path properties associated with the second path.

19. The device of claim 17, wherein the second connection identifier is different from the first connection identifier, and the one or more programs further cause the device to:

add a sub-entry to the entry with mapping of the second connection identifier to the path properties associated with the second path.

20. The device of claim 17, the one or more programs further cause the device to:

deliver the content over the first path to the QUIC client;
obtain the streaming properties of the content; and
resume delivery of the content over the second path in accordance with the streaming properties and using the second token.

* * * * *